(12) United States Patent
Banry et al.

(10) Patent No.: US 7,165,794 B2
(45) Date of Patent: Jan. 23, 2007

(54) PASSIVE SAFETY DEVICE

(75) Inventors: Pascal Banry, Bourg Saint Christophe (FR); Thierry Roussel, Fayl la Foret (FR); Riad Chaaya, Windsor (CA)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/717,304

(22) Filed: Nov. 19, 2003

(65) Prior Publication Data

US 2004/0217605 A1 Nov. 4, 2004

(30) Foreign Application Priority Data

Nov. 19, 2002 (FR) .................................. 02 14464

(51) Int. Cl.
*B60R 19/34* (2006.01)
(52) U.S. Cl. ........................ 293/133; 293/102; 293/132
(58) Field of Classification Search ................ 293/102, 293/109, 132, 133
See application file for complete search history.

(56) References Cited

U.S. PATENT DOCUMENTS

| | | | | |
|---|---|---|---|---|
| 3,933,387 | A * | 1/1976 | Salloum et al. ............. | 293/120 |
| 4,072,334 | A | 2/1978 | Seegmiller | |
| 4,361,352 | A * | 11/1982 | Wakamatsu .................. | 293/120 |
| 5,078,439 | A * | 1/1992 | Terada et al. ................ | 293/109 |
| 5,080,411 | A * | 1/1992 | Stewart et al. ............... | 293/122 |
| 5,378,031 | A * | 1/1995 | Ohno et al. .................. | 293/102 |
| 5,803,514 | A * | 9/1998 | Shibuya et al. .............. | 293/133 |
| 6,406,081 | B1 * | 6/2002 | Mahfet et al. ............... | 293/133 |
| 6,416,094 | B1 * | 7/2002 | Cherry ........................ | 293/120 |
| 6,428,065 | B2 * | 8/2002 | Sato et al. ................... | 293/102 |
| 6,435,577 | B1 | 8/2002 | Renault | |
| 6,435,579 | B1 * | 8/2002 | Glance ........................ | 293/102 |
| 6,540,275 | B1 * | 4/2003 | Iwamoto et al. ............. | 293/120 |
| 6,890,011 | B2 * | 5/2005 | Arvelo et al. ................ | 293/133 |
| 2002/0125725 | A1 * | 9/2002 | Satou .......................... | 293/132 |
| 2002/0149214 | A1 * | 10/2002 | Evans ......................... | 293/120 |

FOREIGN PATENT DOCUMENTS

| | | |
|---|---|---|
| DE | 198 06 541 | 9/1998 |
| FR | 2 445 783 | 8/1980 |
| GB | 2 033 535 | 5/1980 |

* cited by examiner

Primary Examiner—Lori L. Coletta
(74) Attorney, Agent, or Firm—James R. Williams

(57) ABSTRACT

The invention provides a motor vehicle bumper comprising:
a shield presenting a first impact zone situated substantially at the same height as the knee of an adult pedestrian and, immediately below said first zone, a second impact zone situated substantially at the height as the tibia of an adult pedestrian;
a beam placed behind the shield substantially at the same height as the knee of an adult pedestrian, in register with and at a certain distance from the shield; and
interposed between the beam and the shield, at least one block made of a compressible material, the block having a front end disposed beside the shield and a rear end disposed beside the beam, and having a cross-section that increases from its front end towards its rear end.

The front end of the block is disposed in register with the second impact zone of the shield.

12 Claims, 5 Drawing Sheets

FIG. 3a    PRIOR ART
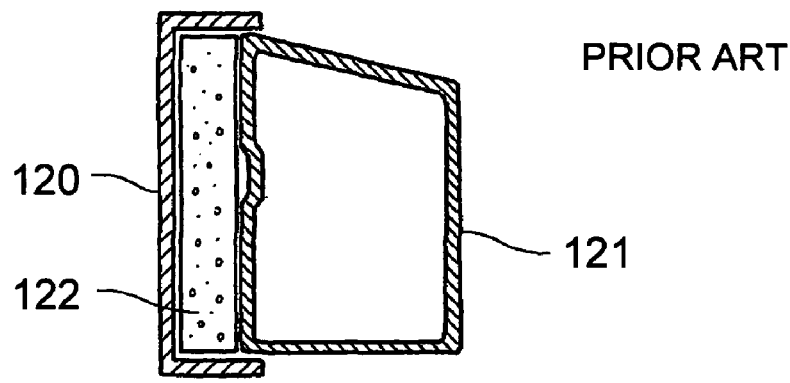
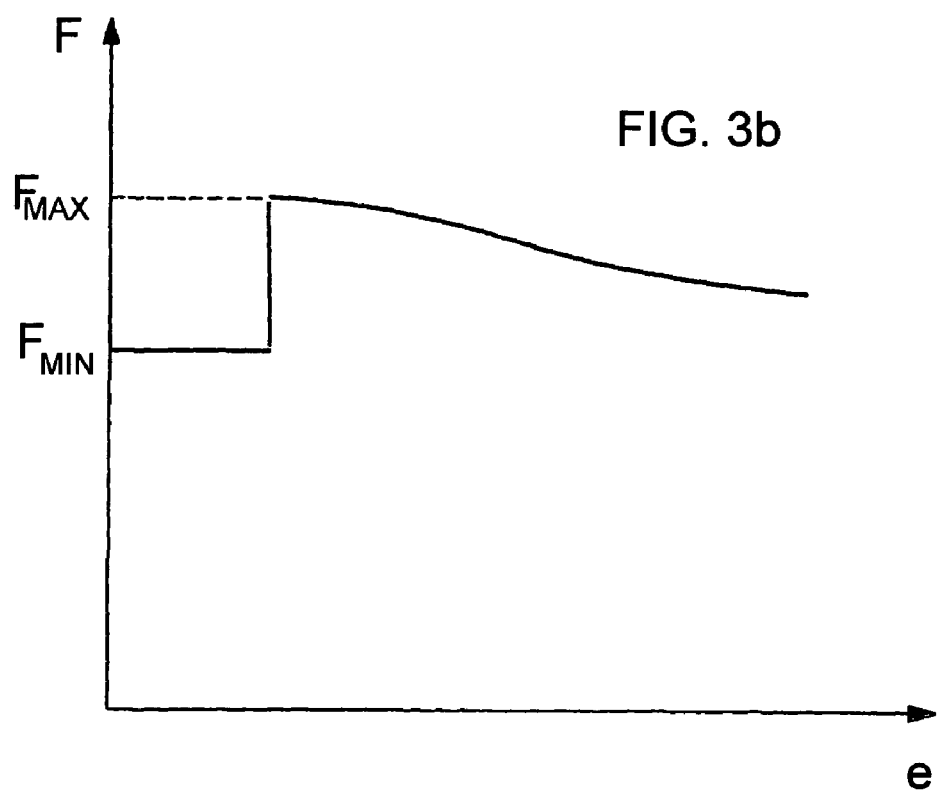
FIG. 3b
PRIOR ART

PASSIVE SAFETY DEVICE

The present invention relates to passive safety for motor vehicles.

BACKGROUND OF THE INVENTION

Until recently, manufacturers were concerned essentially with the safety of passengers in a vehicle.

Numerous solutions have appeared for that purpose consisting in designing bumpers and in stiffening the external structure thereof so as to form a barrier for protecting the vehicle cabin.

Such bumpers generally comprise a shield, also referred to as a bumper "skin", acting essentially to provide decoration, but also serving to absorb impacts of small amplitude. Bumpers also comprise one or more beams extending transversely behind the shield and forming a barrier to protect the vehicle cabin. In general, the beam is placed at the same level as the side rails of the vehicle, a height which corresponds substantially to the height of the knee of an adult pedestrian passing in front of the vehicle.

In order to preserve the vehicle cabin and thus its passengers as well as possible, it was considered a few years ago that the structure of the vehicle and thus of the bumper should be as rigid as possible. Consequently, bumpers were used of the kind shown in section in FIG. 1a, in which the shield (100) is placed in the immediate vicinity of the beam (101).

The problem with that type of bumper lies in the structure being too rigid. Progress made in designing structures and in simulating impacts (commonly referred to as "crash testing"), have revealed that a predetermined amount of deformation of the vehicle structure makes it possible to increase safety within the cabin.

Another problem with such bumpers consists in the way the force (F) suffered by a pedestrian as a function of the extent (e) to which the pedestrian is pushed into the shield is at a maximum ($F=F_{MAX}$) at the moment of impact between the vehicle and the pedestrian, as can be seen from the graph of FIG. 1b. Consequently, the impact suffered by the pedestrian leads to severe lesions of the legs, even if the impact takes place at low speed.

To remedy those problems, manufacturers have turned towards making bumpers comprising materials that are softer in order to absorb impact.

An example of that type of bumper is shown in FIG. 2a, where a bumper shown in section comprises a beam (111) placed behind a shield (110), at a certain distance therefrom. It is possible to make such a bumper because of progress made in injecting plastic materials and in fitting together bodywork parts, thus making it possible for the lines of the shield to be rounded and for it to be placed further away from the beam.

Another way of absorbing shock is shown in FIG. 3a where it can be seen that the bumper comprises a core (122) made of a thermoplastic foam filling the space between the shield (120) and the beam (121) so as to absorb a little more of the impact suffered by the shield.

As can be seen in the graphs of FIGS. 2b and 3b, the problem with such absorption means lies in the way the force suffered by a pedestrian in the event of a head-on collision is at a minimum ($F=F_{MIN}$) at the moment of impact, and passes instantaneously to a maximum value ($F=F_{MAX}$) once the shield becomes pressed against the beam.

Thus, in the example of FIG. 3a, even if the variation in the force suffered by the pedestrian during indentation (i.e. the difference between the maximum force $F_{MAX}$ and the minimum force $F_{MIN}$) is less than that suffered by the pedestrian in earlier situations, the force suffered during impact still remains large.

Consequently, a pedestrian suffering a head-on collision with a bumper of the above-described type will be subjected to a strong force against the leg, and in particular against the knee, and that can lead to severe lesions. These lesions can be the result both of impact proper and of the leg bending excessively about the knee.

Thus although the safety of vehicle passengers has been improved, the problem consists in improving the safety of pedestrians by avoiding lesions at the level of a pedestrian's knee, a zone that is particularly fragile and difficult to treat, and to do so by making impact as non-violent as possible.

In order to preserve the knee joint, recent standards define the maximum angle (about 20°) that the bottom portion of the leg should take up relative to the top portion in the event of an impact.

One solution for complying with these standards consists in using a low restrainer beneath the bumper. A low restrainer arranged at the bottom of the bumper has two effects. Firstly it distributes the force suffered by the leg over two impact zones, and secondly in the event of a collision with a pedestrian, it prevents the bottom of the pedestrian's tibia from passing under the vehicle, thereby restricting the angle to which the leg is bent. Such low restrainers are in widespread use in present-day bumpers.

Nevertheless, the problem with such low restrainers lies in imposing a particular appearance on the bumpers of the vehicle. Such a constraint can degrade the attractiveness of the vehicle.

OBJECTS AND SUMMARY OF THE INVENTION

The invention seeks to remedy such a problem by proposing a bumper without a low restrainer, comprising a beam at the height of a pedestrian's knee, said bumper sparing the pedestrian's leg by subjecting it to force progressively.

To this end, the invention provides a motor vehicle bumper comprising:

- a shield presenting a first impact zone situated substantially at the height of a knee of an adult pedestrian, and immediately below said first zone, a second impact zone situated substantially at the height of the tibia of an adult pedestrian;
- a beam placed behind the shield substantially at the height of the knee of an adult pedestrian, in register with and at a certain distance from the shield; and
- interposed between the beam and the shield, at least one block made of a compressible material, having a front end disposed on the side of the shield and a rear end disposed in register with the beam, the block having a cross-section that increases from its front end towards its rear end;

wherein the front end of the block is disposed in register with the second impact zone of the shield.

Thus, by means of the invention, in the event of a head-on collision with a pedestrian, the block compresses, thereby providing resistance which is initially very small at the moment of impact and then rises progressively and continuously while the shield is being indented. This results in the force to which the pedestrian is subjected being spread out, thereby having the effect of minimizing injuries.

In addition, the point of impact between the pedestrian's leg and the vehicle shield is situated immediately below the pedestrian's knee, while still having a bumper without a low restrainer.

Optionally, the shield comprises a top portion and a bottom portion set back from the top portion, and in which the beam is placed in register with the top portion, and the block is interposed between the beam and the top portion.

Thus, by means of this bottom portion, which optionally constitutes a restrainer, in the event of an impact, the pedestrian's knee comes initially into contact with the top portion of the shield which indents progressively in the manner explained above, until the pedestrian's leg comes over the bottom portion at the moment it comes into contact with the beam. During an impact, this has the effect of keeping the pedestrian's leg substantially upright, thereby avoiding any risk of the pedestrian going under the vehicle.

In a particular embodiment of the invention, the bumper comprises a single block disposed transversely, running along the beam.

In other embodiments, it comprises a plurality of blocks that are spaced apart or juxtaposed.

The block presenting a front face facing towards the shield and an opposite rear face facing towards the beam, presents, for example, a cross-section that is trapezoidal in shape with its small base formed by the front face and its large base formed by the rear face.

This shape makes it simple to implement the above-described increase in section for causing the force applied to a pedestrian by the bumper to increase progressively. This shape also makes it simple to obtain a front face that is to be in register with the tibia of a pedestrian and a rear face that is to be in register with both the tibia and the knee.

In a particular embodiment, the block presents a cross-section in the form of a rectangular trapezoid. It thus presents a downwardly-facing bottom face forming the side of the trapezoid which is perpendicular both to its small base and to its large base, via which the block rests on a shoulder of the shield, for example, which shoulder extends towards the beam.

Optionally, the first impact zone of the shield is situated at a height above the ground that is greater than 450 millimeters (mm). Thus, since the knee of a pedestrian of adult size is situated 500 mm above the ground, given the values cited in the standards, this zone is situated in register with the knee of a pedestrian.

Also optionally, the rear end of the block is of section that is more than twice that of the front end of the block. This difference in section thus serves to cause the impact to be damped progressively.

The material from which the block is made is constituted, for example, by a foam, and preferably by expanded polypropylene.

The invention also provides the use in a motor vehicle bumper of a block of compressible material of section that increases going from the outside towards the inside of the vehicle so as to obtain a resisting force from the bumper that increases with increasing indentation of the block during an impact.

BRIEF DESCRIPTION OF THE DRAWINGS

Other objects and advantages of the invention appear in the light of the following description of an embodiment given by way of non-limiting example and described with reference to the accompanying drawings, in which:

FIG. 1b is a graph plotting the force suffered by a pedestrian in the event of a head-on collision with a bumper of the type shown in FIG. 1a;

FIG. 2b is a graph plotting the force suffered by a pedestrian in the event of a head-on collision with a bumper of the type shown in FIG. 2a;

FIG. 3a is a view in longitudinal section showing a third type of bumper from Prior Art;

FIG. 3b is a graph plotting the force suffered by a pedestrian in the event of a head-on collision with a bumper of the type shown in FIG. 3a;

MORE DETAILED DESCRIPTION

Figure 4A:
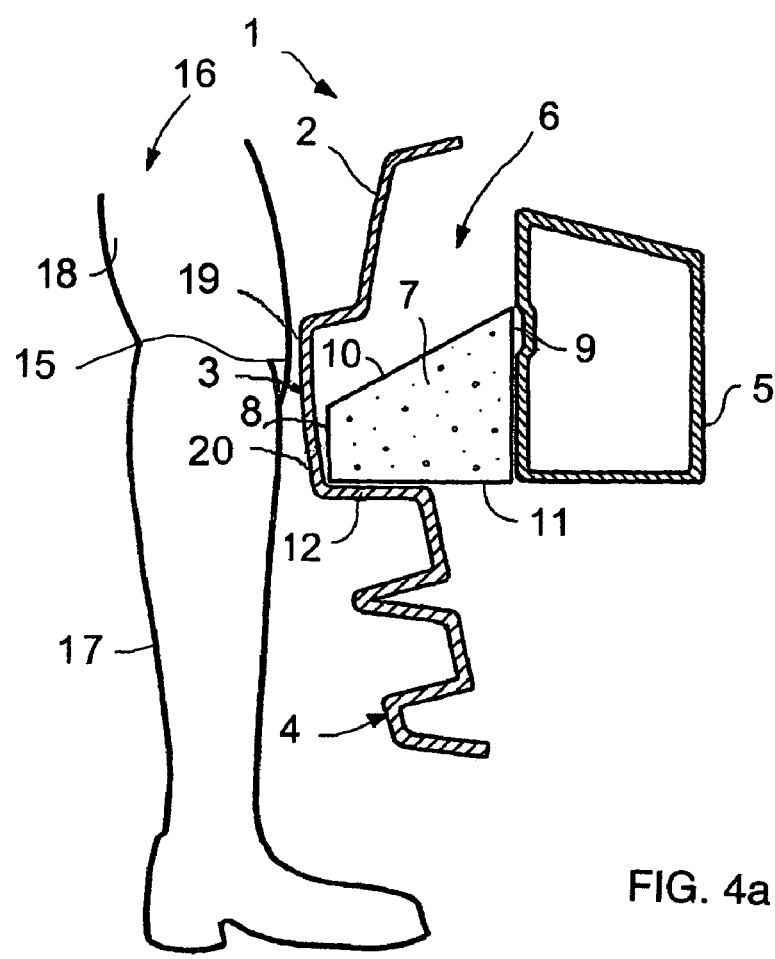
FIG. 4a is a view in longitudinal section showing a bumper comprising a shield, a beam placed just behind, in register with and at a certain distance from the shield, and a block of foam of trapezoidal section interposed between the shield and the beam.

FIG. 4a shows a motor vehicle bumper 1. The bumper 1 comprises a shield 2, also referred to as a bumper "skin", extending transversely between the fenders of the vehicle, and performing a function that is essentially decorative.

The bumper 1 also comprises a beam 5 placed transversely behind the shield 1, in register therewith and at a certain distance therefrom, so as to leave a space 6 between them in which there is placed a block 7 that is interposed between the shield 2 and the beam 5.

FIG. 4a also shows, in front of the bumper 1, the leg 16 of an adult pedestrian of medium size, on the point of being subjected to an impact with the vehicle. The leg shown comprises the knee 15, the tibia 17, and the femur 18 of the pedestrian. As required by standards, it is assumed that the knee 15 of the pedestrian is situated at 500 mm above the ground.

The beam 5 of the vehicle is arranged in register with two side rails of the vehicle (not shown) which corresponds substantially to the height of the knee 15.

The shield 2 presents a top portion 3 which extends substantially vertically and which, in practice, is at the same height as the knee joint 15 of an adult pedestrian of medium size. This top portion 3 is extended downwards by a bottom portion 4 which, in practice, is at the same height as the tibia of the above-defined pedestrian.

The top portion 3 comprises two impact zones 19 and 20. The first zone 19 is situated 500 mm above the ground, which height corresponds to the height of the knee 15. More precisely, the top of the zone 19 is situated at a height greater than 500 mm, and the bottom thereof at about 450 mm. The second zone 20 situated immediately beneath the first zone 19 is situated at the same height as a portion of the tibia 17 of the pedestrian, i.e. at a height above the ground lying in the range 350 mm to 450 mm.

As can be seen in FIG. 4a, the bottom portion 4 of the shield 2 is longitudinally set back from the top portion 3, for reasons set out below.

More precisely, the beam 5 is placed facing the top portion 3, the block 7 being interposed between the beam 5 and the top portion 3.

The block 7 is made of a compressible material suitable for absorbing impact. It preferably comprises a foam, and specifically expanded polypropylene. The function of the block 7 is to damp the impact of the pedestrian against the bumper 1 so as to limit lesions in the legs of the pedestrian.

The block 7 presents a front face 8 facing towards the second zone 20 of the shield 2, and an opposite rear face 9 facing towards the beam 5, the front and rear faces 8 and 9 being interconnected by a top face 10 that faces upwards and by an opposite bottom face 11 that faces downwards.

The block 7 rests via its bottom face 11 on a shoulder 12 of the shield 2, which shoulder 12 extends horizontally towards the beam 5. This ensures that the block 7 is properly held in position.

As can be seen in FIG. 4a, the block of foam 7 is not disposed directly behind the zone 19, whereas there is practically no space between the block 7 and the zone 20.

The cross-section of the block 7 increases going away from the shield 2 towards the beam 5. In other words, the area of the front face 8 is smaller than that of the rear face 9. Specifically, the block 7 presents a cross-section in the form of a trapezoid whose small base is formed by the front face 8 and whose large face is formed by the rear face 9. For example, and as shown in FIG. 4a, the block 7 presents a cross-section in the form of a rectangular trapezoid, whose side which is perpendicular to both the small base and the large base is formed by the bottom face 11.

In the event of an impact against a pedestrian, the impact with the bumper 1 is thus localized at the level of the knee 15. The top portion 3 becomes indented, thereby compressing the block 7 until it becomes indented as far as the bottom portion 4, which then meets the tibia of the pedestrian.

Because of this structure, during indentation of the bumper, the top portion (femur 18) and the bottom portion (tibia 17) of the pedestrian's leg do not form an angle liable to break a ligament (which limit angle is generally taken to lie in the range 15° to 20°). The bottom portion of the pedestrian's leg thus runs little risk of passing under the vehicle, and the knee is saved.

At the moment of impact, the top portion 3 becomes indented as follows.

The knee 15 and the top of the tibia 17 of the pedestrian come simultaneously into contact with the impact zones 19 and 20 of the portion 3.

Because of the trapezoidal shape of the block of foam 7, at the moment of impact, the first zone 19 deforms easily whereas indentation of the second zone 20 is slowed by the foam situated immediately behind it. Consequently, the point of application of the force at the beginning of impact is situated in the second zone 20 and thus on the tibia 17 of the pedestrian while the pedestrian's knee 15 meets little resistance from the zone 19, thus sparing the knee.

Thus, the trapezoidal shape of the foam serves to lower the point at which force is applied, thereby encouraging the leg to rotate as a whole so as to reduce the misalignment angle formed by the tibia 17 and the femur 18, and thus reduce deformation of the knee 15.

Digital simulations performed using two blocks of foam (having density of 45 grams per liter (g/L)) one being rectangular in shape and the other trapezoidal, have shown that the bending angle passes from a value in the first case which is greater than that required by the standard to a value in the second case which is smaller than that required. These simulations show the contribution of the shape of the block of foam on the bending angle of the pedestrian's leg.

Furthermore, the trapezoidal shape of the block of foam 7 has an influence not only on the bending angle of the leg 16, but also on the force suffered by the pedestrian during the impact, which force increases progressively so that said force does not increase suddenly.

Figure 4B:
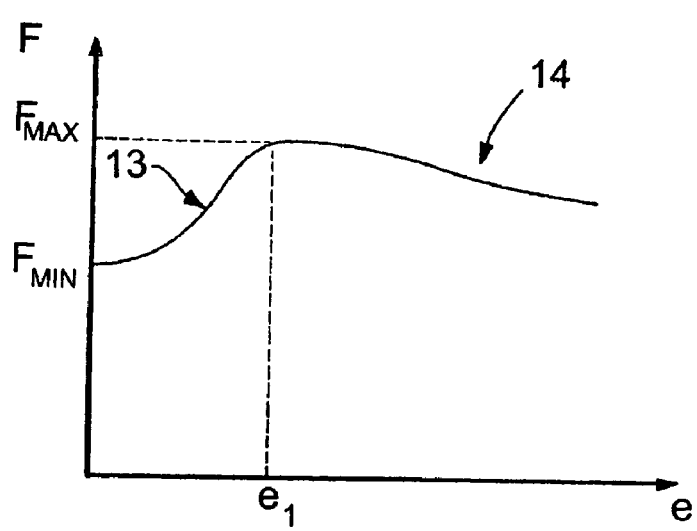
FIG. 4b is a graph plotting the force suffered by a pedestrian in the event of a head-on collision with a bumper of the type shown in FIG. 4a, as a function of the extent to which the bumper is indented.

The graph of FIG. 4b plots the force F to which the pedestrian is subjected during a head-on collision with the bumper 1 as a function of the extent e to which the pedestrian penetrates into the bumper.

The curve presents a first section 13 corresponding to compressing the block 7. This first section 13 extends from no indentation (e=0) which corresponds to the instant of impact between the pedestrian and the shield 2, at which instant the value of the force to which the pedestrian is subjected is at a minimum ($F=F_{MIN}$) up to an intermediate depth of indentation $e_1$ which corresponds to the instant when the pedestrian encounters the beam 5, with the block 7 then being fully compressed. At this instant, the force F to which the pedestrian is subjected is at a maximum ($F=F_{MAX}$).

The force F to which the pedestrian is subjected increases continuously over this first section 13 between its minimum value $F_{MIN}$ and its maximum value $F_{MAX}$.

This first section 13 is extended by a second section 14 running from the intermediate indentation depth $e_1$ and corresponding to the beam 5 being indented. Over this second section 14, the force F to which the pedestrian is subjected decreases continuously from its maximum value $F_{MAX}$, since the beam 5 bends under the reaction opposed by the pedestrian.

Thus, by means of this structure for the bumper 1, the force F to which the pedestrian is subjected is not only a continuous function of indentation e, but also a function that can be differentiated, i.e. the slope of the curve representing it is continuous at all points.

Figure 1A:
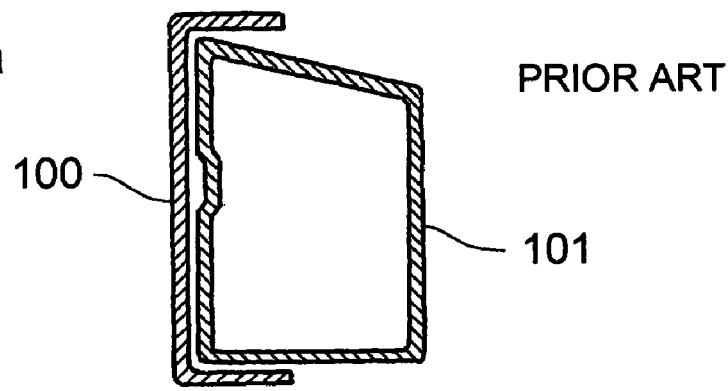
FIG. 1a is a view in longitudinal section showing a first type of bumper from Prior Art.
Figure 1B:
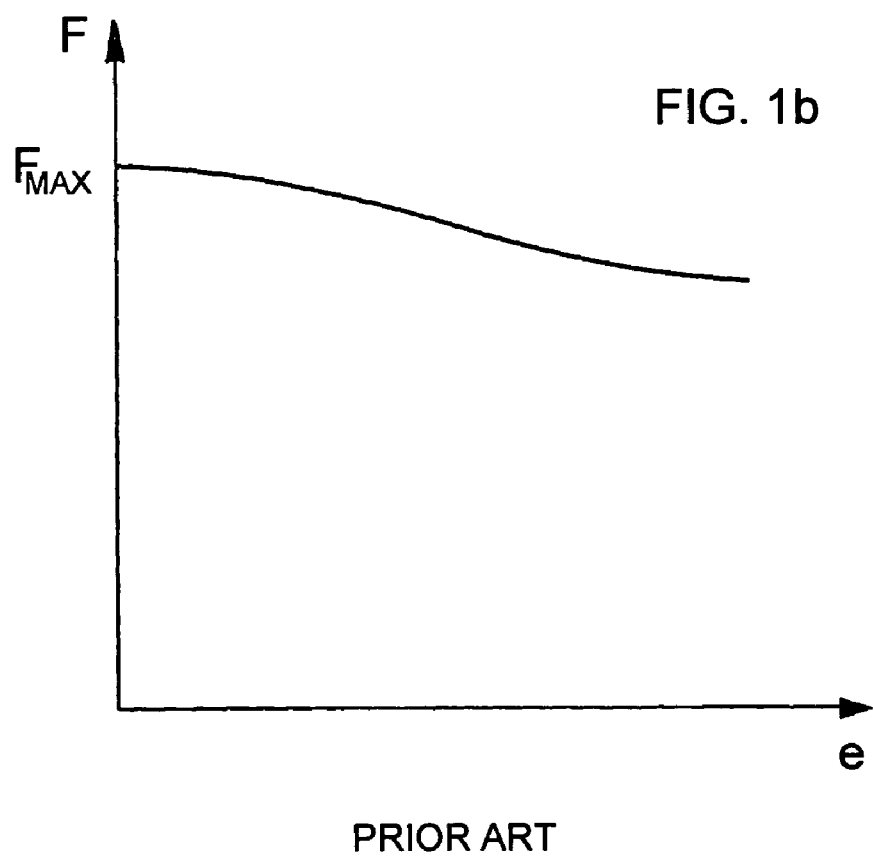
Figure 2A:
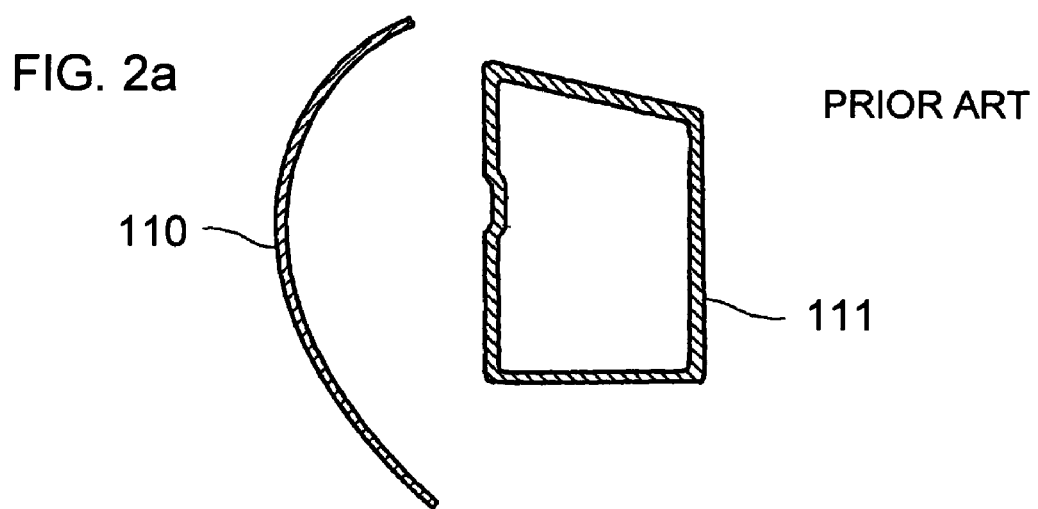
FIG. 2a is a view in longitudinal section showing a second type of bumper from Prior Art.
Figure 2B:
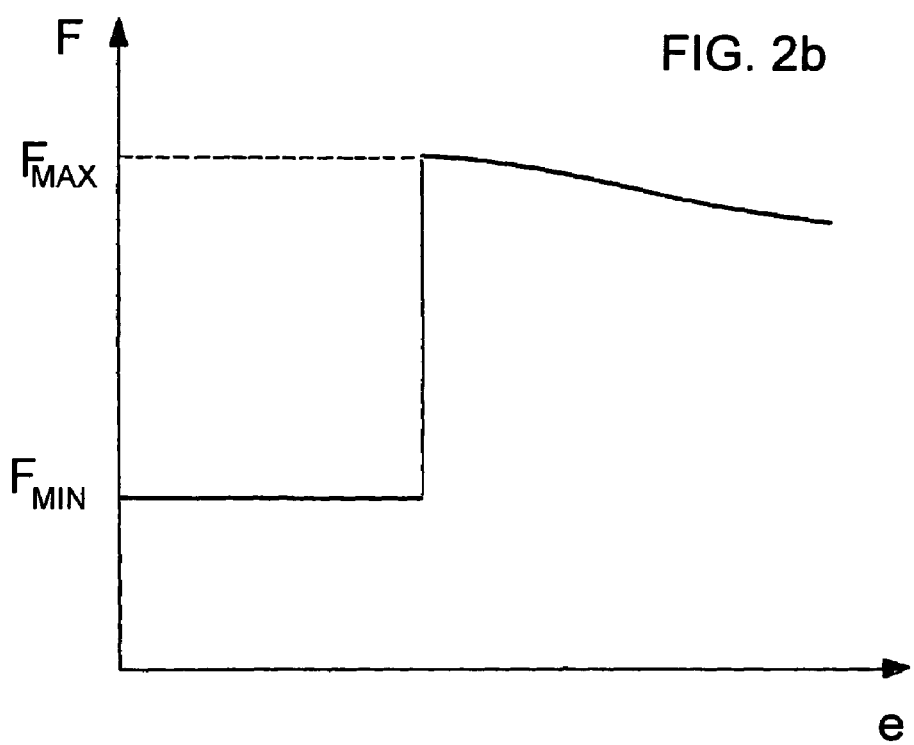

The pedestrian thus suffers only one impact with the shield (e=0), whereas with prior art bumpers, the force to which the pedestrian is subjected is a discontinuous function of indentation, with the pedestrian thus suffering two successive impacts, namely a first impact with the shield and a second impact with the beam, as can be seen from the curves plotted in the graphs of FIGS. 2b, and 3b.

This structure for the bumper 1 thus enables the force to which the pedestrian is subjected to be increased progressively, thereby leading to a significant reduction in leg injuries.

Figure 5:
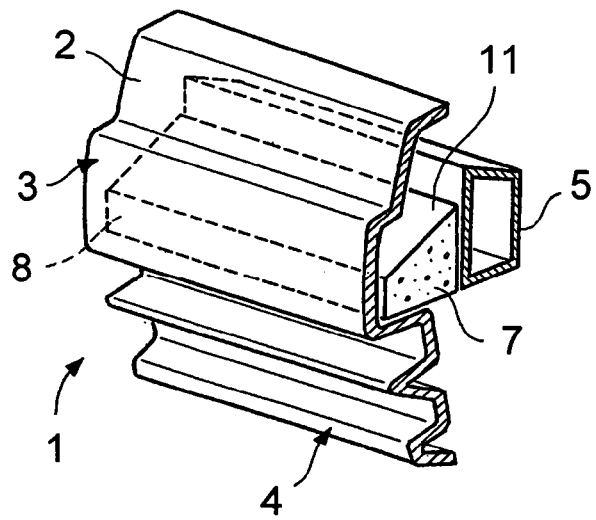
FIG. 5 is a perspective view in partial section of the FIG. 4a bumper comprising a single block of foam running along the beam.

In a preferred embodiment, shown in FIG. 5, the bumper 1 has a single block 7 extending transversely all along the beam 5.

However, the invention is not limited to this embodiment only, and various other solutions achieve similar results.

Thus, in a variant, the bumper 1 may have a plurality of individual blocks 7 each having the overall shape of a truncated pyramid.

Figure 6:
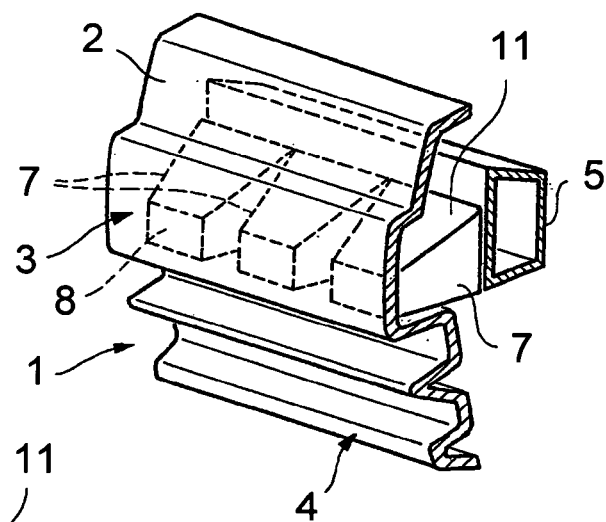
FIG. 6 is a view analogous to FIG. 5 in a first variant embodiment where the bumper has a plurality of blocks of foam that are juxtaposed.
Figure 7:
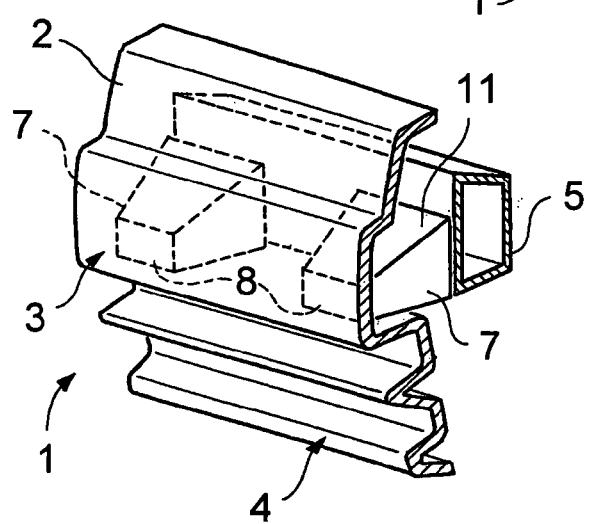
FIG. 7 is a view analogous to FIGS. 5 and 6, showing a second variant embodiment in which the bumper has a plurality of blocks of foam that are spaced apart.

Such blocks 7 may be juxtaposed transversely in a first variant as shown in FIG. 6, or they may be spaced apart transversely, in a second variant as shown in FIG. 7.

The invention claimed is:

1. A motor vehicle bumper comprising:
   a) a shield having a first impact zone located substantially at a first height corresponding to a knee of an adult pedestrian and, immediately below the first impact zone, a second impact zone located substantially at a second height corresponding to a tibia of the adult pedestrian, the shield comprising a top portion and a bottom portion set back from the top portion, the top portion comprising the first and second impact zones;
   b) a beam behind the shield substantially at the first height, in register with and at a certain distance from the shield and in which the beam is placed in register with the top portion; and
   c) at least one block comprising a compressible material interposed between the beam and the shield, the block having a front end in register with the second impact zone of the shield, a rear end in register with the beam), and a cross-section that increases from its front end towards its rear end, the block being interposed between the beam and the top portion.

2. The bumper of claim 1, wherein the beam includes a transverse length and the block is disposed transversely along the length of the beam.

3. A motor vehicle bumper comprising:
   a) a shield having a first impact zone located substantially at a first height corresponding to a knee of an adult pedestrian and, immediately below the first impact zone, a second impact zone located substantially at a second height corresponding to a tibia of the adult pedestrian, the shield comprising a top portion and a bottom portion set back from the top portion, the top portion comprising the first and second impact zones;
   b) a beam behind the shield substantially at the first height, in register with and at a certain distance from the shield and in which the beam is placed in register with the top portion; aid
   c) a plurality of spaced-apart blocks comprising a compressible material interposed between the beam and the shield, the blocks having a front end in register with the second impact zone of the shield, a rear end in register with the beam, and a cross-section that increases from the front end towards the rear end, the blocks being interposed between the beam mid the top portion.

4. A motor vehicle bumper comprising:
   a) a shield having a first impact zone located substantially at a first height corresponding to a knee of an adult pedestrian and, immediately below the first impact zone, a second impact zone located substantially at a second height corresponding to a tibia of the adult pedestrian, the shield comprising a top portion and a bottom portion set back from the top portion, the top portion comprising the first and second impact zones;
   b) a beam behind the shield substantially at the first height, in register with and at a certain distance from the shield and in which the beam is placed in register with the top portion; and
   c) a plurality of juxtaposed blocks comprising a compressible material interposed between the beam and the shield, the blocks having a front end in register with the second impact zone of the shield, a rear end in register with the beam, and a cross-section that increases from the front end towards the rear end, the blocks being interposed between the beam and the top portion.

5. The bumper of claim 1, wherein the cross-section of the block defines a trapezoid having a small base formed by the front end and a large base formed by the rear end.

6. The bumper of claim 5, wherein the cross-section defines a rectangular trapezoid having a perpendicular side that is perpendicular to the small base and the large base.

7. The bumper of claim 6, wherein the block includes a bottom face facing downwards defining the perpendicular side.

8. A motor vehicle bumper comprising:
   a) a shield having a first impact zone located substantially at a first height corresponding to a knee of an adult pedestrian and, immediately below the first impact zone, a second impact zone located substantially at a second height corresponding to a tibia of the adult pedestrian, the shield comprising a top portion and a bottom portion set back from the top portion, the top portion comprising the first and second impact zones;
   b) a beam behind the shield substantially at the first height, in register with and at a certain distance from the shield and in which the beam is placed in register with the top portion; and
   c) at least one block comprising a compressible material interposed between the beam and the shield, the block having a front end in register with the second impact zone of the shield, a rear end in register with the beam, and a rectangular trapezoid cross-section having a small base formed by the front end and a large base formed by the rear end and a bottom face facing downwards that is perpendicular to the small base and the large base, the block being interposed between the beam and the top portion,
   wherein the shield includes a shoulder extending towards the beam, and the bottom face rests on the shoulder.

9. The bumper of claim 1, wherein the first height is more than 450 mm above a ground surface.

10. The bumper of claim 1, wherein the cross-section more than doubles from the front end of the block to the rear end of the block.

11. The bumper of claim 1, wherein the compressible material comprises foam.

12. The bumper of claim 11, wherein the foam material comprises expanded polypropylene.

* * * * *